(No Model.)

F. O. BUTTERFIELD.
EGG AND FRUIT HOLDING IMPLEMENT.

No. 319,954. Patented June 16, 1885.

WITNESSES:
Chas. E. Payne.
C. W. Gordon.

INVENTOR:
Francis O. Butterfield
by
C. B. Tuttle Att'y

UNITED STATES PATENT OFFICE.

FRANCIS O. BUTTERFIELD, OF LYNN, MASSACHUSETTS.

EGG AND FRUIT HOLDING IMPLEMENT.

SPECIFICATION forming part of Letters Patent No. 319,954, dated June 16, 1885.

Application filed November 21, 1884. (No model.)

*To all whom it may concern:*

Be it known that I, FRANCIS O. BUTTERFIELD, of Lynn, in the county of Essex and Commonwealth of Massachusetts, have invented a new Egg and Fruit Holding Implement, of which the following, taken in connection with the accompanying drawings, is a specification.

In the practice of eating boiled eggs it is a custom with some people to grasp the egg in one hand and eat therefrom with a spoon held in the opposite hand. Other persons hold the egg in one hand only to take off the shell, carrying the meat to a receiver, from which it is afterward taken with a spoon. In either of these practices it becomes necessary to hold the egg for some length of time in the fingers, and often the skin of very delicate fingers is burned or injured by heat from the egg. This difficulty is obviated to some extent by using the napkin over the fingers; but to produce a device for holding the egg, as also certain articles of fruit, off from the hand, and thus obviate the said difficulty entirely, is the object of this present invention.

To this end the invention consists in a device formed in contour substantially as shown in the accompanying drawings, and in certain matters of construction pertaining thereto, all of which will be hereinafter more fully described and specifically claimed.

Figure 1:
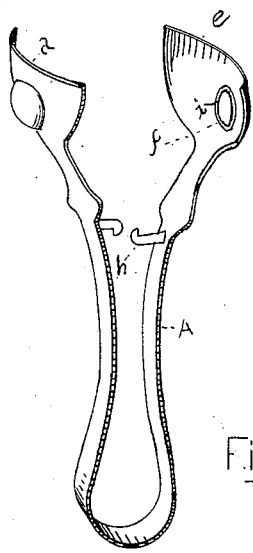
Figure 2:
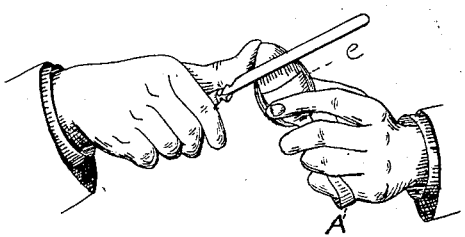
Figure 3:
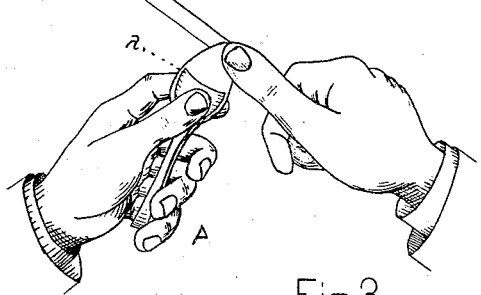

In the drawings, Figure 1 is a perspective view of my egg and fruit holder complete. Fig. 2 is designed to illustrate the manner of using the device, and represents the one hand as holding the device and the other holding a knife in the act of taking off the shell of an egg. Fig. 3 is the reverse of Fig. 2.

This implement may be composed of the ordinary spoon-metal or other suitable materials, many of which will be obvious. It comprises a handle, A, and two half-bowls, *a e*. These parts are preferably constructed in one piece of material, and in form substantially as shown, (see Fig. 1,) though it must be evident that the contour might be varied or the instrument constructed in parts, to be afterward united, without departing from the spirit of my invention. The half-bowls *a e* are designed, when brought together, to form a socket in which the egg is grasped and held, as shown in Figs. 2 and 3. To prevent the egg from slipping about, the surfaces of the bowl are chased or ruffed up by any obvious means. Said bowls *a e* are further provided with a central cavity or chamber, *f*, the object being in part to provide an air-chamber directly under the point of contact or bearing-point for the thumb and finger, to thus prevent the heat from passing directly to the hand; but also to further increase the grip of the implement by allowing portions of the article (particularly in cases of fruit) to recede into these cavities, said cavities are preferably formed by pressing the material outward at this point, thereby forming corresponding elevations, which serve not only to ornament the outside of the bowl, but are particularly useful in keeping the flesh of the thumb and finger from pressing those parts of the metal which bear directly upon the egg. To further intercept the passage of the heat I find it useful, in extreme cases, to fill said cavities partly with non heat-conducting pads *i*. These may be cut from thick paper, wood, or other obvious materials and pressed into the chambers *f*. If desirable, permanent fillings may be used; but I prefer these temporary pads, as they may be easily made, and when used be made anew whenever occasion demands.

In use the implement is to be held in the hand as shown in Figs. 2 and 3. To facilitate the operation of applying it to the proper position in hand, I construct the handle with a finger-loop formed as shown, and this being adjusted to the fourth or last finger will bring the bowls in proper position relatively to the thumb and finger. It also permits the handle to be made very small without danger of turning around in the hand. The bowls are brought together by pressure of the thumb and finger in order to grasp and hold the object to be manipulated, all as shown in Figs. 2 and 3. Said movement of the bowls will not require the article to be made of spring-metal, though I prefer to use a material having some slight quality of this nature and to combine with the implement a lock or small clasp-hooks, *h*, so that when the bowls are made to grasp an article the arms of the handle may be sprung together and held by the said hooks. I prefer this, as it gives assistance to the hand in holding the bowls together, and so relieves the work of the thumb and finger as to permit change of position and permit a neater and far more graceful manipulation of the hand.

I am aware that salt-tongs have been made of two half-bowls connected by arms to form a handle, the said bowls being of corrugated metal and perforated, in order that the salt or other material might be sifted out in small quantities through the said perforations, and I do not therefore claim such construction.

Having thus described my invention, I claim and desire by Letters Patent to secure—

1. An egg or fruit holding implement consisting of two half-bowls provided with arms united to form a handle, each of said half-bowls having convex projections on its outer surface, forming an air-chamber opening to the interior surface of the bowl, substantially as described.

2. An egg and fruit holding implement consisting of two half-bowls provided with independent arms united to form the handle of the implement, the said bowls containing chambers or cavities about their center, said chambers being partially filled with non-conducting material and forming at the same time air-chambers, whereby the heat is prevented from penetrating to the outer peripheries of said cavities and the hand of the user is thereby protected, substantially as described.

3. An egg or fruit holding implement consisting of two half-bowls held opposite each other and connected by spring-arms united at the rear to form the handle, combined with locking-hooks $h$, projecting from each arm between the closed handle portion and the open front, the said hooks being adapted to engage with each other and lock the arms together to hold the egg or other article, substantially as described.

Signed at Lynn in presence of two witnesses.

FRANCIS O. BUTTERFIELD.

Witnesses:
 CHAS. E. PAYNE,
 C. B. TUTTLE.